(12) United States Patent
Han

(10) Patent No.: US 9,389,144 B2
(45) Date of Patent: Jul. 12, 2016

(54) METHOD FOR DIAGNOSING EGR SYSTEM

(71) Applicants: Hyundai Motor Company, Seoul (KR); Kia Motors Corp., Seoul (KR)

(72) Inventor: Seung Hee Han, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 343 days.

(21) Appl. No.: 14/026,317

(22) Filed: Sep. 13, 2013

(65) Prior Publication Data
US 2014/0372010 A1 Dec. 18, 2014

(30) Foreign Application Priority Data
Jun. 13, 2013 (KR) .................. 10-2013-0067690

(51) Int. Cl.
*F02D 41/00* (2006.01)
*G01M 15/00* (2006.01)
*G01M 15/10* (2006.01)

(52) U.S. Cl.
CPC ............. *G01M 15/102* (2013.01); *F02M 26/49* (2016.02); *F02D 2041/0067* (2013.01)

(58) Field of Classification Search
CPC ............. F02D 2041/0067; F02D 2041/0077; F02M 25/0702; F02M 2025/0762; F02M 2025/0763; G01M 15/02; G01M 15/05
USPC .................. 123/568.16, 568.12; 73/118.74; 701/108
See application file for complete search history.

(56) References Cited

U.S. PATENT DOCUMENTS

| | | | | |
|---|---|---|---|---|
| 4,715,348 A * | 12/1987 | Kobayashi | ......... | F02M 25/0702 701/107 |
| 4,834,054 A * | 5/1989 | Hashimoto | ........ | F02M 25/0702 123/676 |
| 4,974,572 A * | 12/1990 | Aramaki | .................. | F02B 47/08 73/114.74 |
| 5,014,203 A * | 5/1991 | Miyazaki | ........... | F02M 25/0702 123/568.16 |
| 5,243,949 A * | 9/1993 | Osawa | .................. | F02D 41/005 123/568.16 |
| 5,257,610 A * | 11/1993 | Ohuchi | ............... | F02D 41/0055 123/568.16 |
| 5,388,558 A * | 2/1995 | Plapp | ................. | F02M 25/0702 123/520 |

(Continued)

FOREIGN PATENT DOCUMENTS

| | | |
|---|---|---|
| JP | 2724000 B2 | 3/1998 |
| JP | 2012-87676 A | 5/2014 |
| KP | 10-2009-0125900 A | 12/2009 |

(Continued)

*Primary Examiner* — Lindsay Low
*Assistant Examiner* — George Jin
(74) *Attorney, Agent, or Firm* — Morgan, Lewis & Bockius LLP

(57) ABSTRACT

A method for diagnosing an exhaust gas recirculation (EGR) system includes: a setting step of setting a temperature map with respect to a temperature at an outlet side of an EGR line for an output value reflecting a driving state of a vehicle in a state in which an EGR valve is closed; a measuring step of measuring the temperature at the outlet side of the EGR line at the time of an operation of the EGR system; and a diagnosing step of diagnosing that a fault has been generated in an EGR system when the measured temperature at the outlet side of the EGR line is equal to or less than a reference value set in the temperature map.

7 Claims, 3 Drawing Sheets

(56) References Cited

U.S. PATENT DOCUMENTS

| | | | | |
|---|---|---|---|---|
| 5,540,091 | A | * | 7/1996 | Nakagawa .......... F02M 25/0702 123/568.16 |
| 5,727,533 | A | * | 3/1998 | Bidner .................... F02D 21/08 123/568.16 |
| 6,434,476 | B1 | * | 8/2002 | Zagone ................. F02D 41/222 123/568.16 |
| 6,446,498 | B1 | * | 9/2002 | Schricker ........... F02M 25/0731 73/114.37 |
| 2006/0042608 | A1 | * | 3/2006 | Buck ................... F02B 29/0437 123/568.12 |
| 2008/0148827 | A1 | * | 6/2008 | Keski-Hynnila ...... G01M 15/05 73/114.31 |
| 2012/0096855 | A1 | * | 4/2012 | Farmer ................ F02D 41/0072 60/605.2 |
| 2013/0008417 | A1 | * | 1/2013 | Sankar ................ F02D 41/0047 123/568.12 |

FOREIGN PATENT DOCUMENTS

| | | |
|---|---|---|
| KR | 10-2008-0007980 A | 1/2008 |
| KR | 10-2009-0030847 A | 3/2009 |
| KR | 10-2011-0003953 A | 1/2011 |

* cited by examiner

FIG. 3A

FUEL AMOUNT(mg)

| ENGINE REVOLUTION PER MINUTE(rpm) | 20 | 40 | 60 | 80 | 100 | 120 | 140 | 160 | 180 | 200 | 220 | 240 |
|---|---|---|---|---|---|---|---|---|---|---|---|---|
| 1100 | 0 | 0 | 0 | 0 | 0 | 0 | 0 | 0 | 0 | 0 | 0 | 0 |
| 1200 | 0 | 0 | 0 | 0 | 0 | 0 | 0 | 0 | 0 | 0 | 0 | 0 |
| 1300 | 0 | 0 | 0 | 0 | 0 | 0 | 0 | 0 | 0 | 0 | 0 | 0 |
| 1400 | 0 | 0 | 0 | 0 | 0 | 0 | 0 | 0 | 0 | 0 | 0 | 0 |
| 1500 | 0 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 | 0 |
| 1700 | 0 | 0 | 0 | 0 | 0 | 0 | 0 | 0 | 0 | 0 | 0 | 0 |
| 1840 | 0 | 0 | 0 | 0 | 0 | 0 | 0 | 0 | 0 | 0 | 0 | 0 |
| 1870 | 0 | 0 | 0 | 0 | 0 | 0 | 0 | 375K | 375K | 377K | 377K | 377K | 377K |
| 1900 | 0 | 0 | 0 | 0 | 0 | 0 | 0 | 375K | 375K | 377K | 377K | 377K | 377K |
| 1930 | 0 | 0 | 0 | 0 | 0 | 0 | 0 | 375K | 375K | 377K | 377K | 377K | 377K |
| 1960 | 0 | 0 | 0 | 0 | 0 | 0 | 0 | 0 | 0 | 0 | 0 | 0 |

FIG. 3B

FUEL AMOUNT(mg)

| ENGINE REVOLUTION PER MINUTE(rpm) | 20 | 40 | 60 | 80 | 100 | 120 | 140 | 160 | 180 | 200 | 220 | 240 |
|---|---|---|---|---|---|---|---|---|---|---|---|---|
| 1100 | 0 | 0 | 0 | 0 | 0 | 0 | 0 | 0 | 0 | 0 | 0 | 0 |
| 1200 | 0 | 0 | 0 | 0 | 0 | 0 | 0 | 0 | 0 | 0 | 0 | 0 |
| 1300 | 0 | 0 | 0 | 0 | 0 | 0 | 0 | 0 | 0 | 0 | 0 | 0 |
| 1400 | 0 | 0 | 0 | 0 | 0 | 0 | 0 | 0 | 0 | 0 | 0 | 0 |
| 1500 | 0 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 | 0 |
| 1700 | 0 | 0 | 0 | 0 | 0 | 0 | 0 | 0 | 0 | 0 | 0 | 0 |
| 1840 | 0 | 0 | 0 | 0 | 0 | 0 | 0 | 0 | 0 | 0 | 0 | 0 |
| 1870 | 0 | 0 | 0 | 0 | 0 | 0 | 0 | 358K | 358K | 360K | 360K | 360K | 360K |
| 1900 | 0 | 0 | 0 | 0 | 0 | 0 | 0 | 358K | 358K | 360K | 360K | 360K | 360K |
| 1930 | 0 | 0 | 0 | 0 | 0 | 0 | 0 | 358K | 358K | 360K | 360K | 360K | 360K |
| 1960 | 0 | 0 | 0 | 0 | 0 | 0 | 0 | 0 | 0 | 0 | 0 | 0 |

METHOD FOR DIAGNOSING EGR SYSTEM

CROSS REFERENCE TO RELATED APPLICATION

The present application claims priority of Korean Patent Application Number 10-2013-0067690 filed Jun. 13, 2013, the entire contents of which application is incorporated herein for all purposes by this reference.

BACKGROUND OF INVENTION

1. Field of Invention

The present invention relates to a method for diagnosing an exhaust gas recirculation (EGR) system, and more particularly, to a method for diagnosing an EGR system capable of diagnosing a fault of the EGR system by a temperature sensor installed at an outlet side of an EGR line.

2. Description of Related Art

Generally, a basic purpose of using an exhaust gas recirculation (EGR) system is to decrease NOx exhausted from an engine. When exhaust gas exhausted from the engine is again circulated to an intake port, oxygen required for combustion is relatively decreased, such that NOx is decreased.

However, when a flow of EGR gas is decreased due to a fault of the EGR system, an exhaust amount of NOx exhausted at the time of combustion is increased, which is an on-board diagnostics (OBD) rule and needs to be monitored.

Meanwhile, in a EURO4 commercial diesel engine, a fault of the EGR system has been diagnosed using an air mass flow (AMF) sensor.

That is, when an intake amount is measured by the AMF sensor, a difference value between the measured intake amount and an expectation intake amount mapped thereto is calculated. In addition, the calculated difference value is compared with a reference intake amount, and a fault diagnosis that an EGR gas amount is insufficient or excessive is performed when the different value does not satisfy the reference intake amount.

However, in the above-mentioned method for diagnosing a fault, the fault of the EGR system is indirectly diagnosed by the AMF sensor. Therefore, when the AMF sensor is deteriorated or a fault is generated in the AMF sensor, an erroneous diagnosis that the entire EGR system is problematic is performed.

Further, in the AMF sensor, a deviation of a sensed value occurs due to aging of the sensor such as attachment of foreign materials in exhaust gas to the AMF sensor, a difference in an intake layout according to a kind of vehicle (a difference in an air mass flow shape) occurs, a measurement error by the AMF sensor increases by a driving surrounding environment of a driver, or the like.

Meanwhile, according to the related art, Korean Patent Laid-Open Publication No. 10-2011-0003953 entitled "Structure and Method for Controlling EGR Valve of Engine" has been disclosed.

However, even in this scheme, an EGR flow of an EGR system is adjusted using the AMF sensor, such that an error occurs when the AMF sensor is deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method for diagnosing an EGR system capable of diagnosing a fault of the EGR system by a temperature sensor installed at an outlet side of an EGR line.

According to various embodiments of the present invention, there is provided a method for diagnosing an exhaust gas recirculation (EGR) system, including: a setting step of setting a temperature map with respect to a temperature at an outlet side of an EGR line for an output value reflecting a driving state of a vehicle in a state in which an EGR valve is closed; a measuring step of measuring the temperature at the outlet side of the EGR line at the time of an operation of the EGR system; and a diagnosing step of diagnosing that a fault has been generated in an EGR system when the measured temperature at the outlet side of the EGR line is equal to or less than a reference value set in the temperature map.

The output value reflecting the driving state of the vehicle may be an engine revolution per minute (RPM) and a fuel amount.

The setting step may include: an output value measuring step of measuring an output value reflecting a current driving state of the vehicle; and a first diagnosis judging step of performing a diagnosis of the EGR system in the case in which the measured output value satisfies a diagnosis reference output value.

The setting step may further include: a coolant temperature measuring step of measuring a temperature of coolant; and a second diagnosis judging step of performing a diagnosis of the EGR system in the case in which the measured coolant temperature satisfies a diagnosis reference temperature value.

In the diagnosing step, when the measured temperature at the outlet side of the EGR line is equal to or less than a first reference value set in the temperature map and exceeds a second reference value set in the temperature map, it may be diagnosed that a fault has been generated in the EGR valve, and a warning lamp may be turned on.

In the diagnosing step, when the measured temperature at the outlet side of the EGR line is equal to or less than the second reference value set in the temperature map, it may be diagnosed that the fault has been generated in the EGR valve, the warning lamp may be turned on, and an engine torque may be forcibly limited.

The diagnosing step may include: an output value measuring step of measuring an output value reflecting a current driving state of the vehicle; and a first diagnosis cancel judging step of performing a diagnosis cancel of the EGR system in the case in which the measured output value satisfies a diagnosis cancel reference output value.

The diagnosing step may further include: a coolant temperature measuring step of measuring a temperature of coolant; and a second diagnosis cancel judging step of performing a diagnosis cancel of the EGR system in the case in which the measured coolant temperature satisfies a diagnosis cancel reference temperature value.

The present methods and apparatuses have other features and advantages apparent from the accompanying drawings, incorporated herein, and below Detailed Description, which together serve to explain certain principles of the present invention.

BRIEF DESCRIPTION OF THE DRAWINGS

FIGS. 3A and 3B are views showing absolute temperature data at an outlet side of an EGR line at the time of fault diagnosis depending on turning-on of a warning lamp and absolute temperature data at an outlet side of an EGR line at the time of fault diagnosis depending on turning-on of a warning lamp and torque restriction in accordance with the present invention, respectively.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
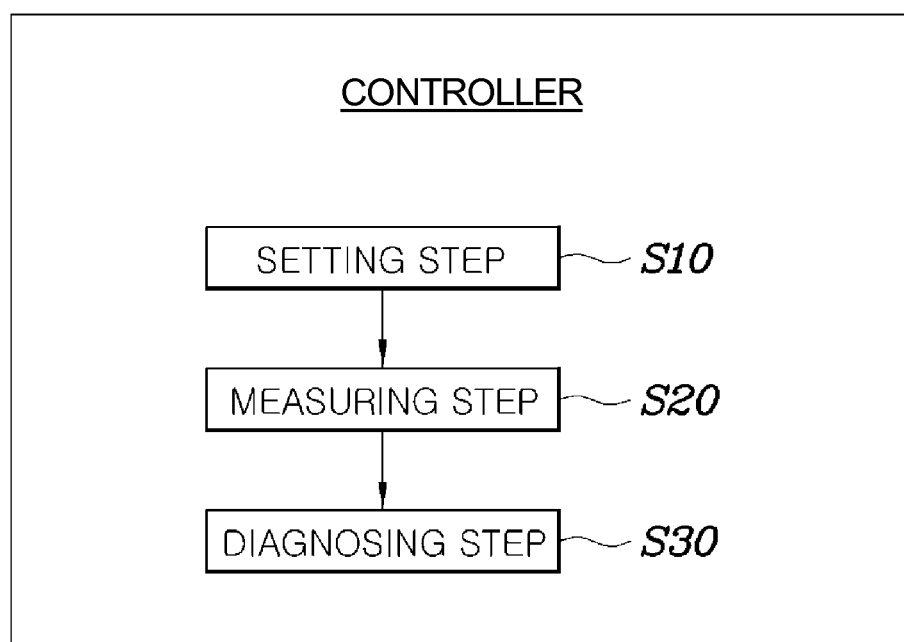
FIG. 1 is a block diagram sequentially showing an exemplary method for diagnosing an exhaust gas recirculation (EGR) system according to the present invention.
Figure 2:
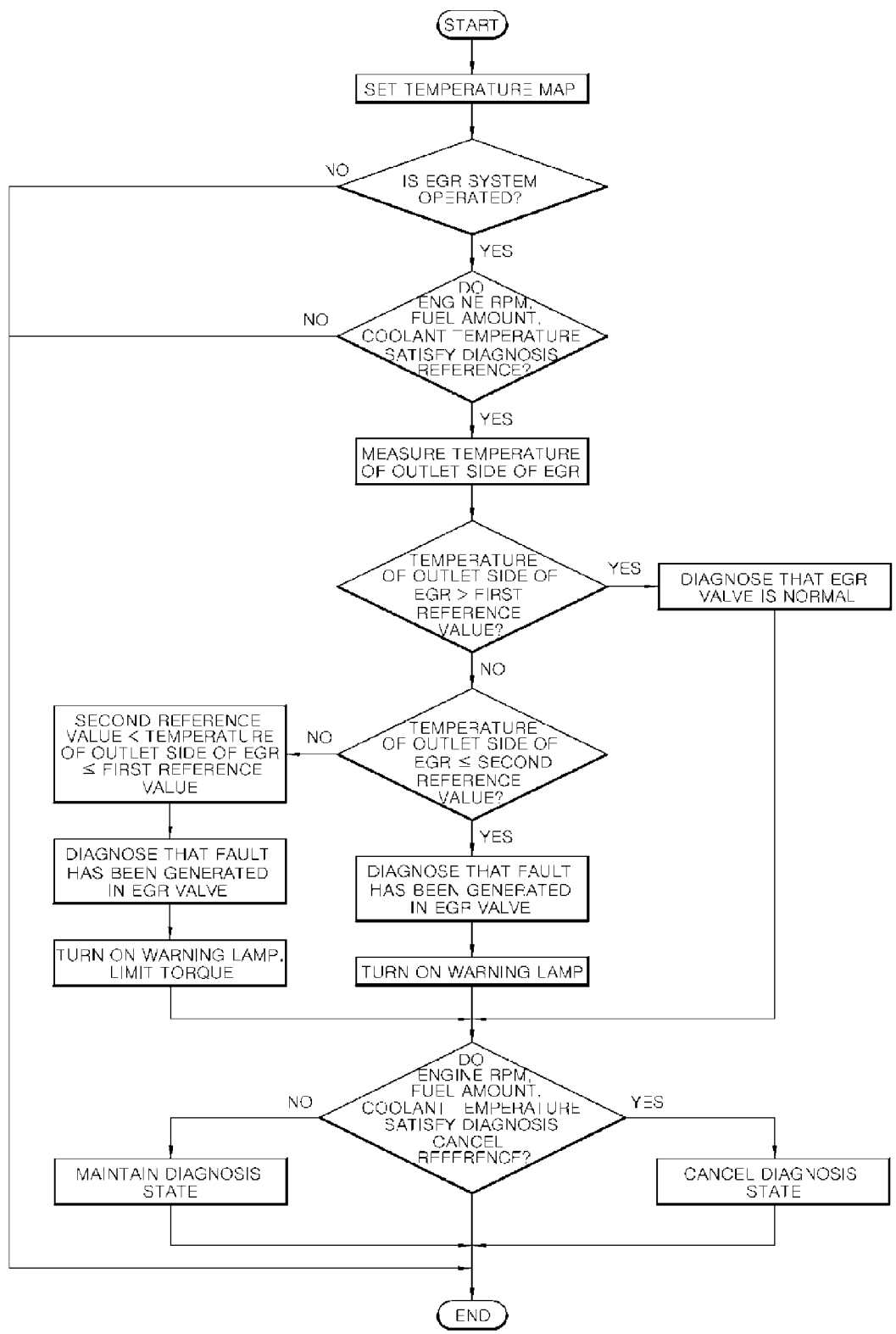
FIG. 2 is a flow chart showing an exemplary diagnosis flow of the method for diagnosing an EGR system according to of the present invention.

FIG. 1 is a block diagram sequentially showing a method for diagnosing an exhaust gas recirculation (EGR) system according to various embodiments of the present invention; and FIG. 2 is a flow chart showing a diagnosis flow of the method for diagnosing an EGR system according to various embodiments of the present invention.

The method for diagnosing an EGR system according to various embodiments of the present invention mainly includes a setting step, a measuring step, and a diagnosing step.

The method for diagnosing an EGR system by a controller of the EGR system according to various embodiments of the present invention will be described in detail with reference to FIG. 1. The method for diagnosing an EGR system according to various embodiments of the present invention includes a setting step of setting a temperature map with respect to a temperature at an outlet side of an EGR line for an output value reflecting a driving state of a vehicle in a state in which an EGR valve is closed; a measuring step of measuring the temperature at the outlet side of the EGR line at the time of an operation of the EGR system; and a diagnosing step of diagnosing that a fault has been generated in an EGR system when the measured temperature at the outlet side of the EGR line is equal to or less than a reference value set in the temperature map.

Here, the output value reflecting the driving state of the vehicle may be an engine revolution per minute (RPM) and a fuel amount.

In addition, a temperature sensor may be installed at the outlet side of the EGR line to measure the temperature at an outlet side of the EGR line.

That is, the temperature sensor measures the temperature at the outlet side of the EGR line at which EGR gas is introduced into an intake line and compares the temperature measured in real time with the reference value set in the temperature map. In this case, the temperature of the EGR gas increases or decreases in proportion to a flow of EGR gas.

According to the above-mentioned principle, the temperature set in the temperature map is a value measured in a state in which an EGR valve is closed. Since the meaning that the measured temperature is lower than the temperature in the temperature map measured in the state in which the EGR valve is closed is that a flow of EGR gas is not sufficiently supplied, when the temperature of the EGR gas is equal to or less than the temperature set in the temperature map, it is diagnosed that a fault has been generated in the EGR system.

Therefore, an air mass flow (AMF) sensor is not used for diagnosing the fault of the EGR system, such that an erroneous diagnosis of the EGR system due to deterioration of the AMF sensor and external driving environment factors is prevented.

According to various embodiments of the present invention, the setting step may include an output value measuring step of measuring an output value reflecting a current driving state of the vehicle and a first diagnosis judging step of performing a diagnosis of the EGR system in the case in which the measured output value satisfies a diagnosis reference output value.

That is, as an example, in the case in which the engine RPM is in a range of 1870 to 1930 rpm, an amount of fuel supplied in the range is 140 to 300 mg, and this condition is continued for a predetermined time, an EGR diagnosis logic is performed to improve precision in diagnosing the fault of the EGR system.

Particularly, the setting step may further include a coolant temperature measuring step of measuring a temperature of coolant and a second diagnosis judging step of performing a diagnosis of the EGR system in the case in which the measured coolant temperature satisfies a diagnosis reference temperature value.

That is, as an example, in the case in which the coolant temperature is in a range of 70 to 100° C. and this condition is continued for a predetermined time, an EGR diagnosis logic is performed to improve precision in diagnosing the fault of the EGR system and diagnose whether or not the fault has been generated in the EGR system based on abnormality of an operation of the EGR valve without an effect of an EGR cooler.

Meanwhile, according to various embodiments of the present invention, in the diagnosing step, when the measured temperature at the outlet side of the EGR line is equal to or less than a first reference value set in the temperature map and exceeds a second reference value set in the temperature map, it may be diagnosed that a fault has been generated in the EGR valve, and a warning lamp may be turned on.

In addition, in the diagnosing step, when the measured temperature at the outlet side of the EGR line is equal to or less than the second reference value set in the temperature map, it may be diagnosed that the fault has been generated in the EGR valve, the warning lamp may be turned on, and an engine torque may be forcibly limited.

FIGS. 3A and 3B are views showing absolute temperature data at an outlet side of an EGR line at the time of fault diagnosis depending on turning-on of a warning lamp and absolute temperature data at an outlet side of an EGR line at the time of fault diagnosis depending on turning-on of a warning lamp and torque restriction in various embodiments of the present invention, respectively.

That is, an exhaust amount of NOx should be forcibly monitored depending on an on-board diagnostics (OBD) forcible rule. According to various embodiments of the present invention, when the exhaust amount of NOx is 3.5 to 7.0 g/kWh, the warning lamp is controlled to be turned on, and when the exhaust amount of NOx exceeds 7.0 g/kWh, a torque of the engine is controlled to be limited as well as the warning lamp is controlled to be turned on.

FIG. 3A shows a temperature at an outlet side of an EGR line when the exhaust amount of NOx is 3.5 to 7.0 g/kWh. When the temperature at the outlet side of the EGR line is a temperature (for example, a temperature of FIG. 3A) equal to and less than the first reference value and exceeds the second reference value, it is judged that a flow of EGR gas is less than a set flow. Therefore, this fault diagnosis code is stored, and a driver is informed of an abnormal situation of the EGR value by turning on the warning lamp with respect to the corresponding fault diagnosis.

In addition, FIG. 3B shows a temperature at an outlet side of an EGR line when the exhaust amount of NOx exceeds 7.0 g/kWh. When the temperature at the outlet side of the EGR line is a temperature (for example, a temperature of FIG. 3B) equal to and less than the second reference value, it is judged that a flow of EGR gas is less than a set flow. Therefore, this fault diagnosis code is stored, a driver is informed of an abnormal situation of the EGR value by turning on the warning lamp with respect to the corresponding fault diagnosis, and the torque of the engine is forcibly limited in a predetermined range.

Meanwhile, according to various embodiments of the present invention, the diagnosing step may include an output value measuring step of measuring an output value reflecting a current driving state of the vehicle and a first diagnosis cancel judging step of performing a diagnosis cancel of the EGR system in the case in which the measured output value satisfies a diagnosis cancel reference output value.

That is, as an example, in the case in which the engine RPM is in a range of 1870 to 1930 rpm, an amount of fuel supplied in the range is 140 to 300 mg, and this condition is continued for a predetermined time, a cancel control of the EGR diagnosis is performed. That is, when an engine RPM and a fuel amount do not satisfy a predetermined condition in a state in which the fault diagnosis is performed, a fault diagnosis state is continuously maintained to improve precision in diagnosing the fault of the EGR system.

In addition, the diagnosing step may further include a coolant temperature measuring step of measuring a temperature of coolant and a second diagnosis cancel judging step of performing a diagnosis cancel of the EGR system in the case in which the measured coolant temperature satisfies a diagnosis cancel reference temperature value.

That is, as an example, in the case in which the coolant temperature is in a range of 70 to 100° C. and this condition is continued for a predetermined time, a cancel logic of the EGR diagnosis is performed. That is, when the coolant temperature does not satisfy a predetermined condition in a state in which the fault diagnosis is performed, a fault diagnosis state is continuously maintained to improve precision in diagnosing the fault of the EGR system and diagnose whether or not the fault has been generated in the EGR system based on abnormality of an operation of the EGR valve without an effect of an EGR cooler.

According to various embodiments of the present invention, the temperature at the outlet side of the ERG line and the temperature set in the temperature map are compared with each other and a fault situation that a flow of EGR gas is not sufficiently supplied is diagnosed in the case in which the temperature at the outlet side of the ERG line is lower than the set temperature. Therefore, an air mass flow (AMF) sensor is not used for diagnosing the fault of the EGR system, such that an erroneous diagnosis of the EGR system due to deterioration of the AMF sensor and external driving environment factors may be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for diagnosing an exhaust gas recirculation (EGR) system, comprising:
    setting a temperature map with respect to a temperature at an outlet side of an EGR line for an output value reflecting a driving state of a vehicle in a state in which an EGR valve is closed;
    measuring the temperature at the outlet side of the EGR line at a time of an operation of the EGR system; and
    diagnosing that a fault has been generated in the EGR system when the measured temperature at the outlet side of the EGR line is equal to or less than a reference value set in the temperature map,
    wherein in the diagnosing step, when the measured temperature at the outlet side of the EGR line is equal to or less than a first reference value set in the temperature map and exceeds a second reference value set in the temperature map, it is diagnosed that a fault has been generated in the EGR valve, and a warning lamp is turned on.

2. The method of claim 1, wherein the output value reflecting the driving state of the vehicle is an engine revolution per minute (RPM) and a fuel amount.

3. The method of claim 1, wherein the setting step includes:
    an output value measuring step of measuring an output value reflecting a current driving state of the vehicle; and
    a first diagnosis judging step of performing a diagnosis of the EGR system in a case in which the measured output value satisfies a diagnosis reference output value.

4. The method of claim 1, wherein the setting step further includes:
    a coolant temperature measuring step of measuring a temperature of coolant; and
    a second diagnosis judging step of performing a diagnosis of the EGR system in a case in which the measured coolant temperature satisfies a diagnosis reference temperature value.

5. The method of claim 1, wherein in the diagnosing step, when the measured temperature at the outlet side of the EGR line is equal to or less than the second reference value set in the temperature map, it is diagnosed that the fault has been generated in the EGR valve, and the warning lamp is turned on.

6. The method of claim 1, wherein the diagnosing step includes:
    an output value measuring step of measuring an output value reflecting a current driving state of the vehicle; and
    a first diagnosis cancel judging step of performing a diagnosis cancel of the EGR system in a case in which the measured output value satisfies a first diagnosis cancel reference output value.

7. The method of claim 1, wherein the diagnosing step further includes:
    a coolant temperature measuring step of measuring a temperature of coolant; and
    a second diagnosis cancel judging step of performing a diagnosis cancel of the EGR system in a case in which the measured coolant temperature satisfies a diagnosis cancel reference temperature value.

* * * * *